T. MARONEY.
CAR DOOR.
APPLICATION FILED OCT. 27, 1913.
1,181,785.
Patented May 2, 1916.
3 SHEETS—SHEET 1.
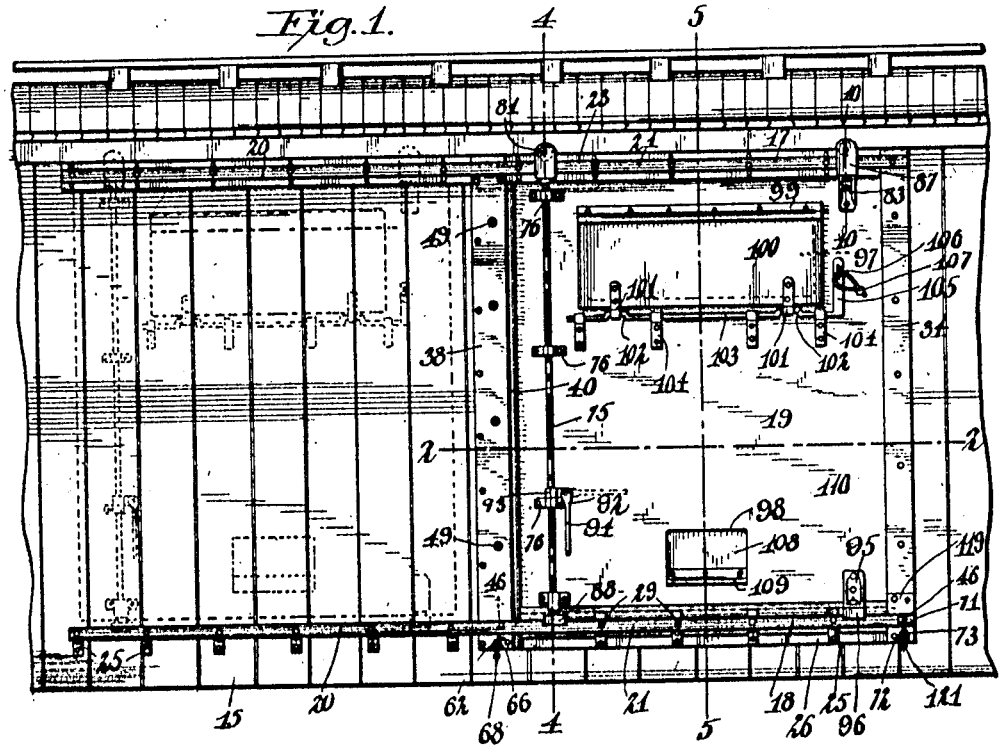
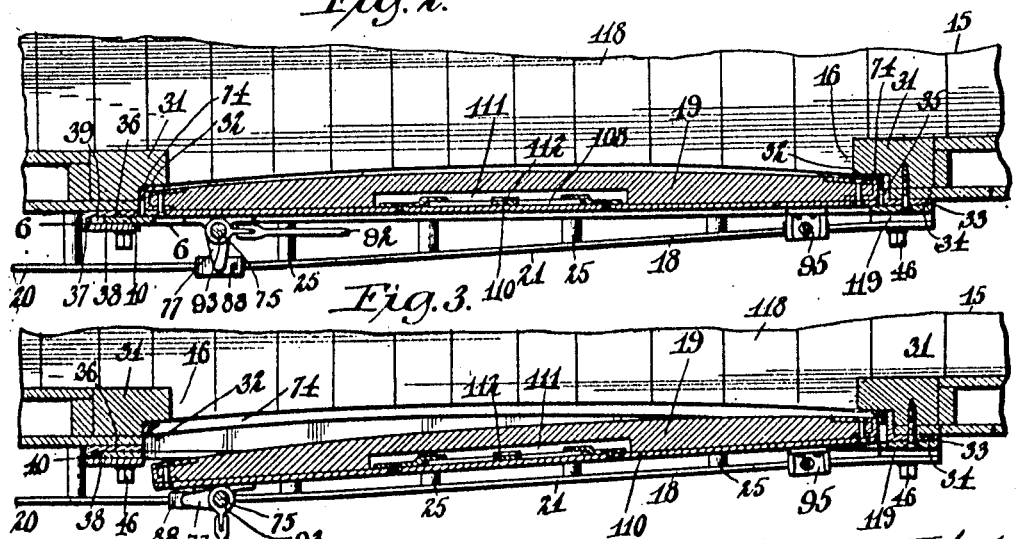

T. MARONEY.
CAR DOOR.
APPLICATION FILED OCT. 27, 1913.
1,181,785.
Patented May 2, 1916.
3 SHEETS—SHEET 2.
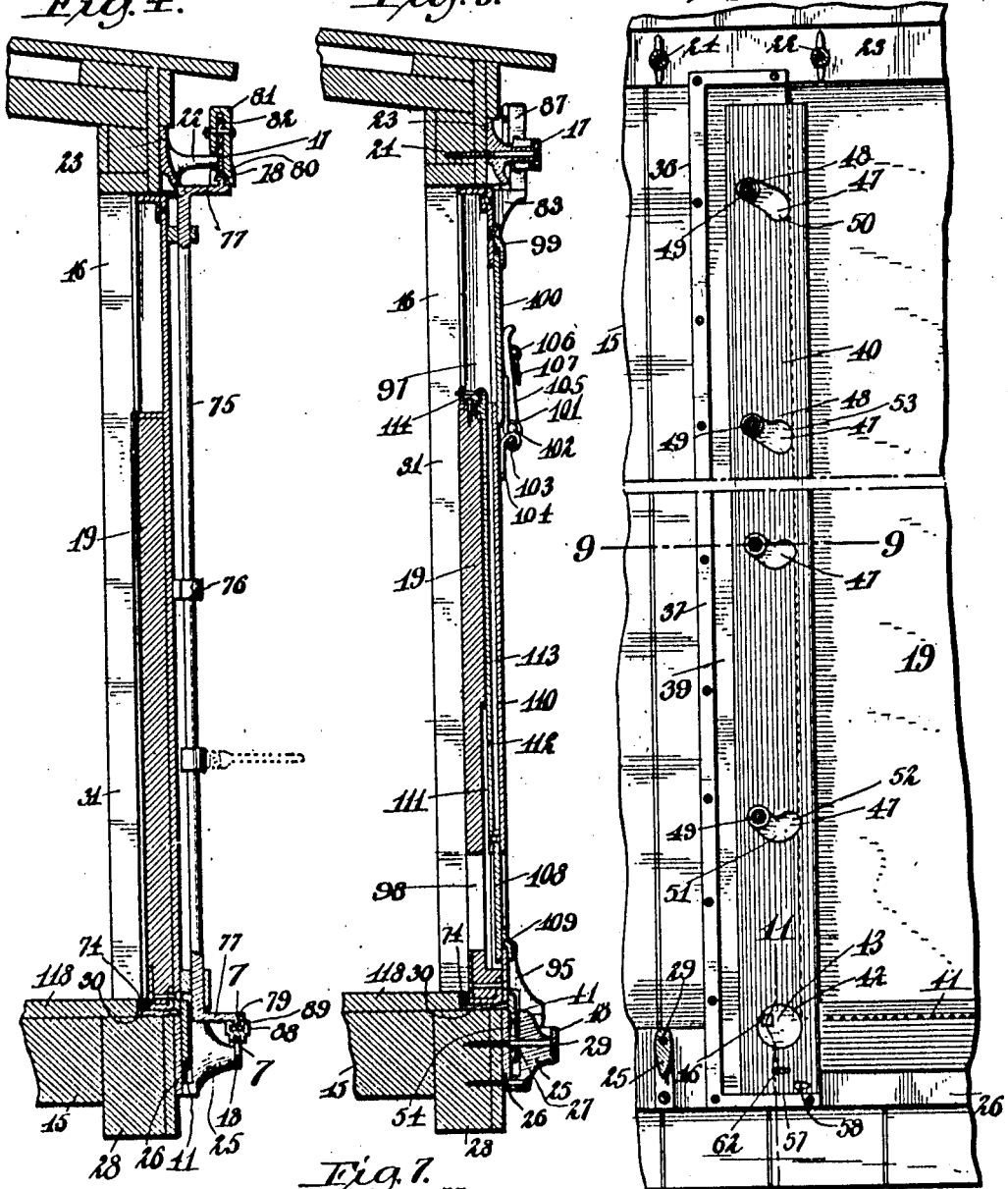
Witnesses:
Jacob Oberst Jr.
Eda M. Schweiger
Thomas Maroney, Inventor.
By Emil Neubart
Attorney.

T. MARONEY.
CAR DOOR.
APPLICATION FILED OCT. 27, 1913.
1,181,785.
Patented May 2, 1916.
3 SHEETS—SHEET 3.
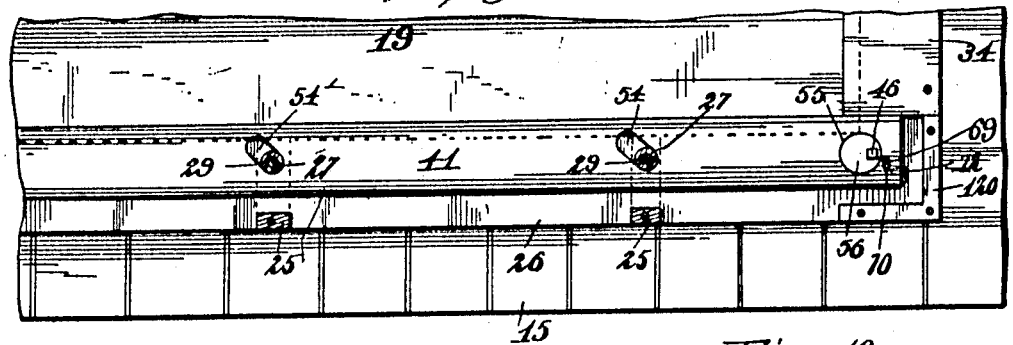
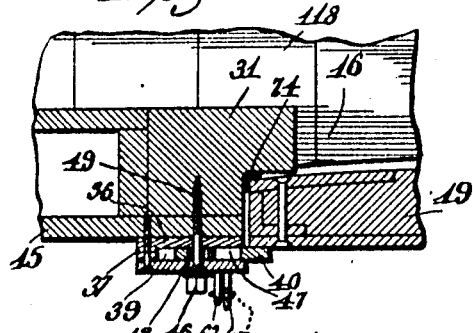
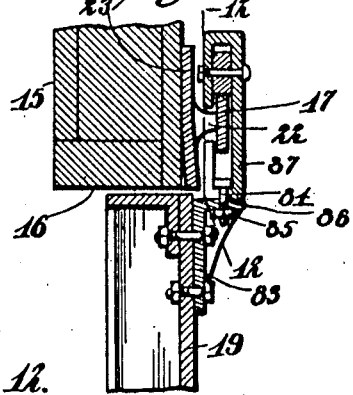
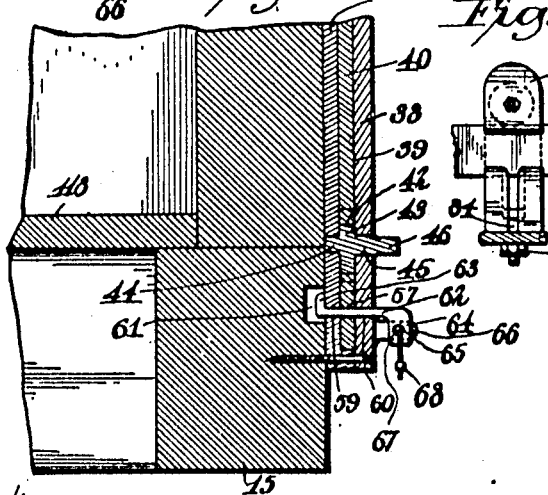
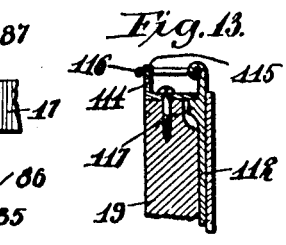
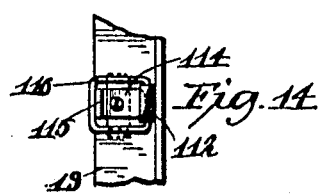
Witnesses:
Jacob Oberst, Jr.
Eda M. Schweiger
Thomas Maroney, Inventor,
By Emil Neubach
Attorney.

UNITED STATES PATENT OFFICE.

THOMAS MARONEY, OF BUFFALO, NEW YORK.

CAR-DOOR.

1,181,785.  Specification of Letters Patent.  Patented May 2, 1916.

Application filed October 27, 1913. Serial No. 797,591.

*To all whom it may concern:*

Be it known that I, THOMAS MARONEY, a citizen of the United States, residing at Buffalo, in the county of Erie and State of New York, have invented certain new and useful Improvements in Car-Doors, of which the following is a specification.

My invention relates to improvements in doors for box freight cars; its primary object being the provision of a door which can be used as an ordinary car door for package or bulk freight or as a grain car door, it being particularly designed for the latter purpose.

Another object of my invention is to provide a car door and improved adjuncts which, when used on cars carrying grain provides for closing of crevices between the door and its frame so as to insure a tight joint and prevent loss of grain by leakage.

Another object of my invention is to provide a car door and adjuncts therefor secured to the body of the car and arranged so that when carrying grain within the car said adjuncts may be moved in co-acting relation with the car door, and when carrying package or bulk freight they may be moved out of coacting relation with said car door.

Another object of my invention is to so construct the car door and its relative parts that all coopering or boarding up of the car door opening, as now required when transporting grain, may be dispensed with, thus eliminating the cost of labor and material required each time a car is put into use in transporting grain, which material is an absolute loss owing to the fact that it cannot again be used for coopering another car.

Another object of my invention is to so construct the car door and its relative parts that the pressure of the grain within the car will cause tight joints to be made between the door and its co-acting crevice-closing plates.

With these and other objects in view, my invention consists in the novel features of construction, and in the arrangement and combination of parts to be hereinafter described and more particularly pointed out in the subjoined claims.

In the drawings,—Figure 1 is a side elevation of a portion of a car equipped with my improved car door and its adjuncts. Fig. 2 is an enlarged horizontal section taken on line 2—2, Fig. 1, the car door being entirely closed. Fig. 3 is a similar section showing the car door slightly open and in position to be moved along its tracks to completely open the door opening. Fig. 4 is an enlarged vertical section taken on line 4—4, Fig. 1. Fig. 5 is an enlarged vertical section taken on line 5—5, Fig. 1. Fig. 6 is an enlarged vertical section taken on line 6—6, Fig. 2. Fig. 7 is an enlarged vertical section taken on line 7—7, Fig. 4. Fig. 8 is a face view of a portion of a car showing the face plates of the door frame removed. Fig. 9 is an enlarged horizontal section taken on line 9—9, Fig. 6. Fig. 10 is an enlarged vertical section taken on line 10—10, Fig. 1. Fig. 11 is an enlarged vertical section taken on line 11—11, Fig. 6. Fig. 12 is a vertical section taken on line 12—12, Fig. 10. Fig. 13 is a vertical section through the locking device for the unloading door. Fig. 14 is a plan view of the same.

Referring now to the drawings in detail, like numerals of reference refer to like parts in the several figures.

The reference numeral 15 designates the car; 16 the car-door opening, and 17, 18 the upper and lower tracks, respectively, by means of which the car-door 19 is supported and guided in its movements. These tracks 17, 18 are arranged respectively above and below the car-door opening and extend a distance to one side of the same, as is common in freight car construction. As clearly shown in Figs. 2 and 3, each of the tracks has a portion 20 parallel with the side of the car, and a portion 21 arranged at a slight angle to said parallel portion, the parallel portions 20 being arranged to one side of the car door opening and the angular portions 21 being respectively above and beneath the car-door opening. This arrangement of the tracks is not new with applicant, and is now used on some type of cars for directing the car-door out of th car-door opening and along the side of th car at one side of said opening.

The upper track 17 is supported by arm 22 extending from a door cap 23, said trac and the door cap with its arms being se cured in place by screws 24 passed throug the track, the arms and cap and taking in the upper sill or header of the car-door, : best shown in Fig. 5. Said door cap fc lows the lines of the upper track so th it overhangs the car-door in any positi( said door may be in, and this cap is pa ticularly desirable when the car-door fits into the door opening as it serves to prevent rain, sleet or other elements of the weather reaching the upper edge of the door and entering the car at this point.

The lower track 18 is supported by means of brackets 25 which are held against a metallic plate 26 fastened against the side of the car directly beneath the door opening, said brackets having spacing lugs 27 projecting from their rear faces so as to provide a space between them and the plate 26. The means of securing said rail and brackets in place being best illustrated in Fig. 5, wherein screws 29 are shown passing through the rail, the bracket and the plate 26 and taking into the lower sill 28 of the car.

118 designates the floor of the car which slightly overlaps the sill 28. From the floor outwardly to the front face of the plate 26 a metallic plate 30 is provided which faces the lower sill and serves as a door sill.

31 designates the jambs of the door opening, each being rabbeted, as at 32, to receive the vertical longitudinal marginal portions of the door 19. One of the jambs has an angle plate 33 secured thereto, and a facing plate 34 which overhangs the rabbet 32 thereof so as to provide a vertical pocket 35, and secured to the car at the opposite side of the door opening is a plate 36 having at one edge an outstanding flange 37. Secured to said plate is a facing plate 38 which is spaced from the plate 36 by the flange of the latter so as to provide a vertical guide way or chamber 39. In said guide-way or chamber 39 a vertically-disposed crevice-closing plate 40 is positioned; said plate being normally fully confined within the said chamber or guide-way, but when the car is used for transporting grain it is adapted to be slightly extended so as to overlap the adjacent vertical marginal portion of the car door, as clearly shown in Fig. 2. A second crevice-closing plate 41 is provided at the lower end of the car door opening, it being movably held against the plate 26 by the brackets 25, said last-mentioned crevice-closing plate being normally positioned with its upper edge in line with or beneath the door sill 30, but being adapted to be moved upwardly so as to overlap the lower marginal portion of the car door, as shown in Figs. 5 and 6.

The means of guiding and actuating the side crevice-closing plate is best illustrated in Figs. 6 and 11, and for the purpose of actuating said plate the latter is provided with a circular opening 42 near its lower end in which is positioned an eccentrically journaled actuating disk 43, said disk having oppositely-disposed stub shafts 44, 45, which are journaled respectively in the plates 36, 38, the stub shaft 45 being extended through the plate 38 so as to project therefrom and it terminates in a square or other non-circular end portion 46 to which is adapted to be applied a wrench or other suitable tool for rotating the actuating disk and causing the plate to be moved outward or inward in its receiving chamber. In order to permit such movement, the crevice-closing plate is provided with guide slots 47 arranged at intervals in its length, in which slots anti-friction rollers 48 are located which turn loosely upon pins 49 secured in the plates 36, 38 so as to span the chamber or guide way 39 in which the crevice-closing plate is situated. With a view of causing the plate to move outwardly so that first one end overlaps the adjacent edge of the door and the remaining portion of the plate gradually follows by a dragging movement, the guide slots 47 may be irregular, as clearly shown in Fig. 6. The uppermost guide slot being inclined downwardly and outwardly with a slight downward deflection 50 at its inner end, while the lowermost guide slot is directed downwardly and outwardly, as at 51, thence upwardly and outwardly, as at 52, being substantially of V-formation. The second guide slot from the top of the plate is inclined downwardly and outwardly with a slight upward deflection 53, while the third guide slot from the top of the plate is substantially similar to the lowermost guide slot with the exception that one arm of the V-shaped slot is slightly longer than the other. By reason of this construction the lower end of the crevice-closing plate is carried outward during the initial movement of the eccentric actuating disk, and the remainder of the plate is gradually carried outward during the remainder of the movement of said disk thereby requiring less effort to actuate the plate than if said plate were carried outward in a straight line, due to the diminished friction in the passing of the plate onto the car door. For convenience in the claims, this movement of the crevice-closing plate may be termed an irregular movement in contradistinction to a movement in which the plate is carried outwardly with the longitudinal edges thereof retained in vertical position.

The lower crevice-closing plate 41 is actuated in its movements in contact with the metallic plate 26 secured to the side of the car. This last-mentioned crevice-closing plate has diagonal guide slots 54 through which extend the spacing lugs formed on the brackets 25, and at one end of said crevice-closing plate a circular opening 55 is arranged in which an eccentric actuating disk 56 is situated, said disk being similar in construction to the actuating disk 43 previously described, and having the non-circular portion of its stub shaft projecting through the lower track, as at 46, for convenience in applying a wrench or other suitable tool thereto for actuating the same. With the crevice-closing plate provided with a series of diagonal guide slots, the plate is carried upwardly so as to overlap the lower marginal portion of the car door when actuating said eccentric disk 56, the longitudinal edges of said plate being retained in horizontal position during such movement so that the entire upper edge of the same is brought into contact with the door at the same instant, in contradistinction to the action of the crevice-closing plate at the side of the door.

Provision is made for locking the crevice-closing plates in either of their two positions, and for this purpose the side crevice-closing plate is provided with two elongated key openings 57, 58, while the plates 36, 38, which may be said to form a casing for the side crevice-closing plate has registering elongated openings 59, 60, respectively. In rear of the casing formed by said plates 36, 38, a recess 61 is formed in the car sill, for a purpose to presently appear. When this side crevice-closing plate is moved into its receiving casing, the key opening 58 in said plate is brought into registration with the registering openings 59, 60, in said casing, and a suitable key, such as shown at 62, is inserted through the three registering openings, said key having an angular portion 63 at its inner end which enters the recess 61 in the car sill. Upon turning said key one quarter of a complete revolution, the angular portion 63 is swung behind the casing and out of line with the registering key openings, thus holding the crevice-closing plate against movement. With a view of preventing manipulation of said key, the outer end of the same is provided with an angular portion 64 which has a hole 65 formed therein, and when swinging said key into locking position, as shown in Fig. 11, said outer angular portion 64 is swung against an outstanding lug 66 formed on the casing of the crevice-closing plate, said lug having an opening 67 through which and the opening 65 in the key, a seal 68 may be passed so that it will be necessary to break the seal before the key can be removed, it being apparent that so long as the key is held in the key openings in the crevice-closing plate and its casing, said plate cannot be actuated. When it is desired to use the car containing my improvements for transporting package or bulk freight, the crevice-closing plate will be locked in this position, thus preventing actuation of the same and guarding against useless wear or mischievous destruction of the parts. When, however, the car is used for transporting grain and the crevice-closing plate moved outward to overlap the adjacent edge of the car door, the key opening 57 in said plate is brought into registration with the registering opening 59, 60 in the casing, and by inserting the key through the three registering openings and manipulating the same, as described, a seal may be passed through the key and the coöperating lug 65 so as to lock the crevice-closing plate in overlapping position and the door in closed position.

The lower or horizontal crevice-closing plate 41 is provided with an elongated key opening 69, and as this key opening is preferably at the extreme right hand end of said plate, a pair of registering elongated key openings 70, 71 are provided in the plate 26 and a plate 119, secured to plate 34, said plate 26 having at its right hand end the outstanding flange 120 whereby the plate 119 is separated from the body of the plate 26 so as to form a chamber for the reception of the right hand end of the lower or horizontal crevice-closing plate 41. When said crevice-closing plate is moved upwardly with a slight component longitudinal movement, due to the inclination of its guide slots 54, the right hand end edge of said plate is brought adjacent the registering openings 70, 71 in plates 26 and 119, respectively, and by inserting a key 72, similar to the key 62 above described, said key prevents receding movement of said plate. It is to be understood that key 72 is constructed with an angular inner end portion adapted to enter a pocket in the car sill similar to recess 61 shown in Fig. 11, and at its outer end it also has an angular portion, similar to the key 62, through which angular portion and a lug 73 on the plate 119 a seal 121 is passed, thus locking the lower or horizontal crevice-closing plate in position to close the crevice between the lower edge of the car door and the door sill. When said crevice-closing plate is moved downwardly out of contact with the car door, the key opening 69 in said plate is brought into registration with the pair of registering openings 70, 71, and by inserting a key in the registering openings and manipulating the same, as described, the plate will be locked in its lowermost position.

When the door is in closed position, its front face is flush with the inner face of the facing plate 34 at one side of the door opening, and with the inner face of the vertical crevice-closing plate 36 at the opposite side of the opening, it being retained against outward movement by said facing plate 34 and crevice-closing plate 36. Where the door jamb is rabbeted, rubber or other suitable cushion members 74 are provided against which the inner angles or corners of the door bear, thus making a tight joint and prevent rattling of the door. By reason of the position in which the door is held when closed it is necessary in opening the same to swing out one side of the door before it can be retracted from the pocket 35 formed at the other side of the door opening, and before it is possible to swing out the first-mentioned side of the door the crevice-closing plates must be withdrawn from locking position. The means provided for moving the door outwardly preparatory to sliding it on its tracks, comprises a vertical shaft 75 journaled to the door, as at 76, each end of said shaft having an angular portion 77. The upper angular portion 77 of said shaft has an upwardly extending stud 78 and the lower angular portion has a downwardly extending stud 79, each of said studs terminating in an enlargement or head 80. The enlargement or head 80 at the upper end of said shaft is removably secured to a hanger 81, which has a roller 82 adapted to travel on the upper track 17.

Secured to the upper end of the door near one side thereof is a bracket 83 through which is passed a bolt 84, said bolt having a nut 85 applied thereto and bearing against the underside of an outstanding portion 86 of said bracket. Said bolt is removably secured to a hanger 87 similar in construction to the hanger 81 and forms with said hanger a pair of upper hangers by means of which the door is suspended.

The lower stud 79 of the shaft 75 enters a slide block 88 which is movable lengthwise on the lower track 18, said slide block having a T-shaped slot 89 which receives the stud and its enlargement or head, and in order to prevent accidental removement of said stud from said slide block, a plug 90 is secured in said slot by means of a pin 91. It is to be noted that the studs 78, 79 at opposite extremities of the shaft 75 are capable of rotation respectively in the hanger 81 and slide block 88, and in order to rock said shaft a handle 92 is provided, said handle being formed in two sections 93, 94; the section 93 being rigidly secured to said shaft while the section 94 is pivotally secured to said rigid section. By thus arranging the handle, the pivoted portion may assume a vertical position, as shown in full lines in Fig. 1, but when operating the shaft said pivoted portion of the handle is swung to the position shown in dotted lines in said figure so as to permit the shaft to be more conveniently manipulated.

95 represents a bracket secured to the lower end of the car in the vertical plane of the bracket 83 and it is secured to a slide block 96 adapted for movement on the lower track 18. The construction of said slide block and the manner of connecting said bracket thereto being similar to the construction of the corresponding upper bracket and its connection thereof to its co-operating hanger. The offset portions at the upper and lower ends of the shaft 75 serve as cranks and the manipulation of said shaft by means of the handle 92 causes one side of the door to swing outwardly with the studs 78, 79, as its pivotal center, but as hereinbefore stated this outward movement cannot be brought about until after the crevice-closing plates are moved into receding position. When the door is manipulated it may be moved along the track so as to withdraw the opposite side marginal portion of the door from its receiving pocket 35 in the adjacent door jamb, and by reason of the inclination of the tracks 17, 18 at points above and beneath the car door opening, the door may be brought into a plane permitting its being moved outside of the car.

When using the car equipped with my improved car door for transporting package or bulk freight, the car is loaded and unloaded through the car door opening, the crevice-closing plates being retained and preferably locked in receding position so that the door may be slid along its tracks. When, however, the car is to be used for transporting grain it is intended that the door shall be retained in closed position and coopered or closed by the plates 40, 41, and for the purpose of loading the car an opening 97 is provided in the car door 19 near its upper end, while for unloading the car an opening 98 is provided in the car door near its lower end. The opening 97 may be termed a "charging-opening" while the opening 98 may be termed a "discharge opening." On the exterior of the door above the opening 97 a Z-shaped bar 99 is secured in any suitable manner, a portion of said bar being spaced from the door to provide a receiving pocket for the free end of a gate or door 100 which is adapted to close said opening. Said gate or door is pivotally secured at 101 to the cranks 102 of a crank-shaft 103 journaled for rocking movement in suitable brackets 104 secured to the car door directly beneath the opening 97. The gate or door 100 is therefore hinged to the car door beneath the opening 97 and by reason of its having connection with the cranks, the free end thereof will be entered in the space provided between the Z-bar and the car door. One end of the crank-shaft is provided with a laterally-disposed arm or lever 105 which has an opening through which is adapted to be passed a lug 106 extending outwardly from the car door, said lug having an opening therethrough, through which is passed a seal 107 for locking the crank-shaft in the position shown in Fig. 1. In this position said shaft is locked against rocking movement and the door consequently locked in closed position with its free end behind the Z-bar. In order to open said door it will be necessary to break and remove the seal which will permit the crank-shaft to be rocked, and when rocking the same to bring the arm or lever 105 in a depending position with the cranks directed downwardly, the free end of the door will then be withdrawn from the space between the Z-bar 99 and the car door, after which it may be swung on the shaft into open position permitting the introduction of grain into the car through the charging opening in any suitable manner.

The discharge opening 98 at the lower end of the car door is closed by a vertically sliding gate or door 108 which has secured to its lower or marginal portion a Z-bar 109 forming a longitudinal space along the lower edge of the gate or door into which is adapted to fit that portion of the car door immediately beneath the opening 98. It may here be remarked that the car door is preferably a composite door constructed of wood and metal, the door being preferably faced with a sheet of metal 110, and the door openings 97, 98 being formed through said sheet of metal and through the wooden portion of the door faced by said sheet. The gate or door 108 is movable in a vertically-disposed space or pocket 111 formed between the wooden portion of the door and the metallic facing sheet, the wooden portion of the door being cut away for this purpose. Said gate or door 108 is therefore capable of being moved upwardly into said space or pocket when opening the same, and in order to manipulate said gate or door, a bar 112 is secured to its upper end which extends upwardly through a passage 113 extending from the upper end of the space or pocket 111 to the door opening 97. To the sill of the last-mentioned opening is pivotally secured an angular keeper 114, the upwardly extending arm 115 of which is adapted to be engaged by a loop 116 which is pivotally secured to the upper end of the bar 112. Said bar has an inwardly directed lug 117 which is adapted to engage the underside of the keeper, as clearly shown in Fig. 13, and thus prevent the upward movement of said bar and consequently the opening of the gate or door 108. In order to permit the opening of said gate or door it is necessary to disengage the loop 116 from the keeper 114, after which the keeper may be swung into a position parallel with the inner face of the car door, as shown in dotted lines in Fig. 14, thus disengaging said keeper from the lug 117 on the actuating bar of said gate or door and permitting said bar to be elevated and the gate or door 108 to be drawn upwardly into the space or pocket 111 so as to open the discharge opening 98. It is of course apparent that before opening the discharge opening it is necessary to open the charging opening, as access cannot be had to the actuating bar 112 until after the door of the charging opening is swung into open position. By reason of this construction the seal of the door closing the charging opening guards against manipulation of the doors closing the charging and discharge openings without detection.

Although the door is preferably a composite door as shown, constructed of wood and metal, any other construction of car door may be used, as it would clearly be within the skill of any mechanic versed in the art to modify my invention to fit the particular requirements of the door.

It is to be understood that various changes may be resorted to without departing from the spirit of this invention or sacrificing any advantages thereof.

Having thus described my invention, what I claim is,—

1. Means for closing a crevice between a car door and the body of a car comprising guiding elements on the car adjacent the car door opening, a plate having guiding slots through which said guiding elements are passed and having also a circular opening, an eccentric disk fitting into said opening and supported on the car, and means for rotating said eccentric disk.

2. Crevice-closing mechanism for car doors comprising guiding elements adjacent a car door opening, a crevice-closing plate having diagonally-arranged guide slots through which said guiding elements are passed and having also a circular opening near one end thereof, an eccentrically-journaled disk fitting into said opening to move said plate into two different positions, and means for locking said plate in one of its positions.

3. Crevice-closing mechanism for car doors comprising guiding elements adjacent a car door opening, a crevice-closing plate having diagonally-arranged guide slots through which said guiding elements are passed and having also a circular opening near one end thereof, an eccentrically-journaled disk fitting into said opening to move said plate into two different positions, and means for locking said plate in both positions.

In testimony whereof I affix my signature in presence of two witnesses.

THOMAS MARONEY.

Witnesses:
JACOB OBERST, Jr.,
EMIL NEUHART.